(12) United States Patent
Koyfman et al.

(10) Patent No.: US 7,370,296 B2
(45) Date of Patent: May 6, 2008

(54) MODELING LANGUAGE AND METHOD FOR ADDRESS TRANSLATION DESIGN MECHANISMS IN TEST GENERATION

(75) Inventors: Anatoly Koyfman, Kiryat Yam (IL); Allon Adir, Kiryat Tivon (IL); Roy Emek, Tel-Aviv-Jaffa (IL); Yoav Katz, Haifa (IL); Michael Vinov, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 10/853,041

(22) Filed: May 25, 2004

(65) Prior Publication Data

US 2005/0278702 A1  Dec. 15, 2005

(51) Int. Cl.
  *G06F 17/50* (2006.01)
(52) U.S. Cl. .................... 716/3; 716/4; 716/5
(58) Field of Classification Search ........... 716/3–5, 716/17, 18, 1; 702/117–123; 703/1, 2, 13–22; 712/225–227; 717/124–140
See application file for complete search history.

(56) References Cited

U.S. PATENT DOCUMENTS

| | | | | |
|---|---|---|---|---|
| 5,202,889 | A * | 4/1993 | Aharon et al. | 714/739 |
| 5,428,786 | A * | 6/1995 | Sites | 717/151 |
| 5,835,963 | A * | 11/1998 | Yoshioka et al. | 711/207 |
| 5,845,106 | A * | 12/1998 | Stapleton | 703/21 |
| 6,006,028 | A * | 12/1999 | Aharon et al. | 703/21 |
| 6,073,194 | A * | 6/2000 | Lowe | 710/100 |
| 6,081,864 | A * | 6/2000 | Lowe et al. | 710/100 |
| 6,636,849 | B1 * | 10/2003 | Tang et al. | 707/6 |
| 2003/0014734 | A1 | 1/2003 | Hartman et al. | |
| 2004/0088682 | A1 * | 5/2004 | Thompson et al. | 717/124 |
| 2005/0193359 | A1 * | 9/2005 | Gupta et al. | 716/18 |

OTHER PUBLICATIONS

Chandra et al., AVPGEN-A Test Generator for Architecture Verification, IEEE, Jun. 1995, vol. 3, No. 2, pp. 188-200.*
Chandra et al., Constraint Solving for Test case generation, IEEE, 1992, pp. 245-248.*
"Genesys", which is disclosed in the document "Model-Based Test Generation for Process Design Verification", Y. Lichtenstein et al., in Sixth Innovative Applications of Artificial Intelligence Conference, Aug. 1994, pp. 83-94.
Aharon, A., et al., "Test Program Generation for Functional Verification of PowerPC Processors in IBM", 32nd Design Automation Conference, pp. 279-285, 1995.
Chandra, et al., "AVPGEN—A Test Generator for Architecture Verification," IEEE Transactions on Very Large Scale Integration (VLSI) Systems, vol. 3, No. 2, Jun. 1995, pp. 188-200.

* cited by examiner

Primary Examiner—Paul Dinh
Assistant Examiner—Nghia M. Doan (57) ABSTRACT

Methods and systems are disclosed that enhance the ability of a test generator to automatically deal with address translation in a processor design, and without need for creating specific code. A model of the address translation mechanism of a design-under-test is represented as a directed acyclic graph and then converted into a constraint satisfaction problem. The problem is solved by a CSP engine, and the solution used to generate test cases for execution. Using the model, testing knowledge can be propagated to models applicable to many different designs to produce extensive coverage of address translation mechanisms.

25 Claims, 8 Drawing Sheets

MODELING LANGUAGE AND METHOD FOR ADDRESS TRANSLATION DESIGN MECHANISMS IN TEST GENERATION

BACKGROUND OF THE INVENTION

1. Field of the Invention

This invention relates to testing of a hardware design. More particularly, this invention relates to verification of address translation mechanisms in a hardware design.

2. Description of the Related Art

Most modern architectures provide a virtual address space for their applications. An operating system maps these virtual addresses to actual hardware resources, such as memory, disk, and I/O ports, using address translation mechanisms. Supporting a separate virtual address space allows the application to be oblivious to the memory organization. The application may ignore actual memory sizes as well as the details of memory allocation by the operating system.

Address translation mechanisms also play a part in memory protection and caching by maintaining related properties for basic translated memory units (e.g., pages or segments). The translation is mostly carried out using hardware mechanisms, such as translation tables and control registers. The operating system maintains these resources through software, but the translation itself is carried out by the hardware.

An ever-growing demand for better performance requires address translation mechanisms to become more complex in new hardware designs, thereby increasing the risk of design flaws or bugs. Indeed, a significant percentage of such design flaws stems, more or less directly, from address translation mechanisms. Moreover, the complexity of these mechanisms causes the flaws to be difficult to find.

Simulation-based techniques, which continue to be a cornerstone of functional verification, are implemented through the running of test cases. In the past, relatively low design complexity enabled exclusive reliance on deterministic tests that were developed manually. Current practices foster the use of automatic random stimuli generators to add quantity and randomness into the process. In order to stress the verified design, and to ensure good test coverage, the generator needs to have knowledge of the properties of a design-under-test.

The need for a test generation solution applicable to various architectures has led to a model-based test generation scheme, in which knowledge about the design-under-test is kept separate from the test generation engine. The generator is partitioned into a generic, architecture-independent engine and a model that describes the design-under-test.

During the past decade, model-based random test program generators have become popular in architectural design verification and software testing. An example of such a random test generator is the IBM tool, "Genesys", which is disclosed in the document *Model-Based Test Generation for Process Design Verification*, Y. Lichtenstein et al., in Sixth Innovative Applications of Artificial Intelligence Conference, August 1994, pp. 83–94.

The general approach to random test program generation is further discussed in the documents *Test Program Generation for Functional Verification of PowerPC Processors in IBM*, A. Aharon, D. Goodman, M. Levinger, Y. Lichtenstein, Y. Malka, C. Metzger, M. Molcho, and G. Shurek, in 32nd Design Automation Conference, pages 279–285, 1995.

Another conventional test generator, AVPGEN, is disclosed in the document *AVPGEN—A Generator for Architecture Verification Test Cases*, A. Chandra, et al., IEEE Trans. Very Large Scale Integration (VLSI) Syst. 3, No. 2, 188–200 (June 1995).

A test generator, adapted for testing hardware processor design, is disclosed in commonly assigned U.S. Pat. No. 6,006,028, which is herein incorporated by reference. The generator is directed to storing data representing the processor instruction set and modeling semantic entities associated with each instruction in a declarative model or specification.

In U.S. patent application Ser. No. 09/847,309, (Publication No. US 2003/0014734 A1), entitled Technique Using Persistent Foci For Finite State Machine Based Software Test Generation, of common assignee herewith and herein incorporated by reference, an automated method of software testing is disclosed in which a software program is represented as a finite state machine model, and transitions between stages are represented as directed edges between states.

The development and maintenance of test generators such as the above, when targeted at address translation mechanisms, has proved to be difficult and expensive. The model-based approach, including a comprehensive and declarative specification of a design mechanism, has apparently never been successfully applied to the realm of address translation. Instead, for every new processor design that a test generator is required to support, a developer must write code to handle the specific translation mechanism being verified.

SUMMARY OF THE INVENTION

According to a disclosed embodiment of the invention, a software package extends the model-based approach to test generation into the realm of address translation verification. Modeling and generation services are provided, which enhance the ability of existing test generators to deal with address translation in a hardware design automatically. A developer of a test generator is then free to concentrate on specific problem domains, while relying on the methods and systems of the invention to deal with address translation issues. According to the invention, address translation, which is modeled in the design-under-test as a directed acyclic graph, is converted into a constraint satisfaction problem (CSP). The problem is solved by a CSP engine, and the solution used to generate test cases for execution in the design-under-test.

It is an advantage of the invention that testing knowledge can be propagated to models applicable to many different designs to produce extensive coverage of translation mechanisms, without need for specialized code to be written by programmers for the different designs.

The invention provides a method for testing an address translation mechanism of a design-under-test, which is carried out by modeling the address translation mechanism as a directed acyclic graph, wherein nodes represent stages of the mechanism, and edges represent state transitions between the stages, formulating a constraint satisfaction problem from the graph, solving the constraint satisfaction problem so as to generate a test case for the design-under-test, and executing the test case in the design-under-test.

In one aspect of the invention, multi-access architectural rules of the design-under-test are associated with the nodes. The multi-access architectural rules are obeyed in different translations.

According to still another aspect of the invention, the multi-access architectural rules are implemented as logical tables.

In a further aspect of the invention, translation tables are linked to complex connectors in the directed acyclic graph.

Another aspect of the invention includes generating testing knowledge relevant to test programs for a second design-under-test responsively to the model of the address translation mechanism. The testing knowledge can be generated using value partitioning.

In yet another aspect of the invention, testing knowledge is generated by memorizing values of modeled attributes that were produced in a previous constraint satisfaction problem.

In still another aspect of the invention, testing knowledge is generated by biasing at least a portion of the nodes and the edges of the directed acyclic graph.

In one aspect of the invention modeling the address translation mechanism includes establishing translation tables that are linked to table edges or complex connectors, and entering match conditions and transformations in the translation tables, wherein satisfaction of one of the match conditions causes one of the state transitions to occur via a designated one of the table edges.

In an additional aspect of the invention, testing knowledge relevant to test programs for a second design-under-test is generated by entering close match events in at least a portion of the logical tables.

The invention provides a computer software product, including a computer-readable medium in which computer program instructions are stored, which instructions, when read by a computer, cause the computer to perform a method for testing an address translation mechanism of a design-under-test, which is carried out by modeling the address translation mechanism as a directed acyclic graph, wherein nodes represent stages of the mechanism, and edges represent state transitions between the stages, formulating a constraint satisfaction problem from the graph, solving the constraint satisfaction problem so as to generate a test case for the design-under-test, and executing the test case in the design-under-test.

The invention provides a verification system for an address translation mechanism of a design-under-test including a processor operative to access a declarative model of the address translation mechanism that is represented as a directed acyclic graph, wherein nodes represent stages of the mechanism, and edges represent state transitions between the stages corresponding to respective ones of the nodes. The processor is adapted to formulate a constraint satisfaction problem from the graph, and is further adapted to solve the constraint satisfaction problem so as to generate a test case for the design-under-test, and to output the test case for execution in the design-under-test.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

System Overview.

Figure 1:
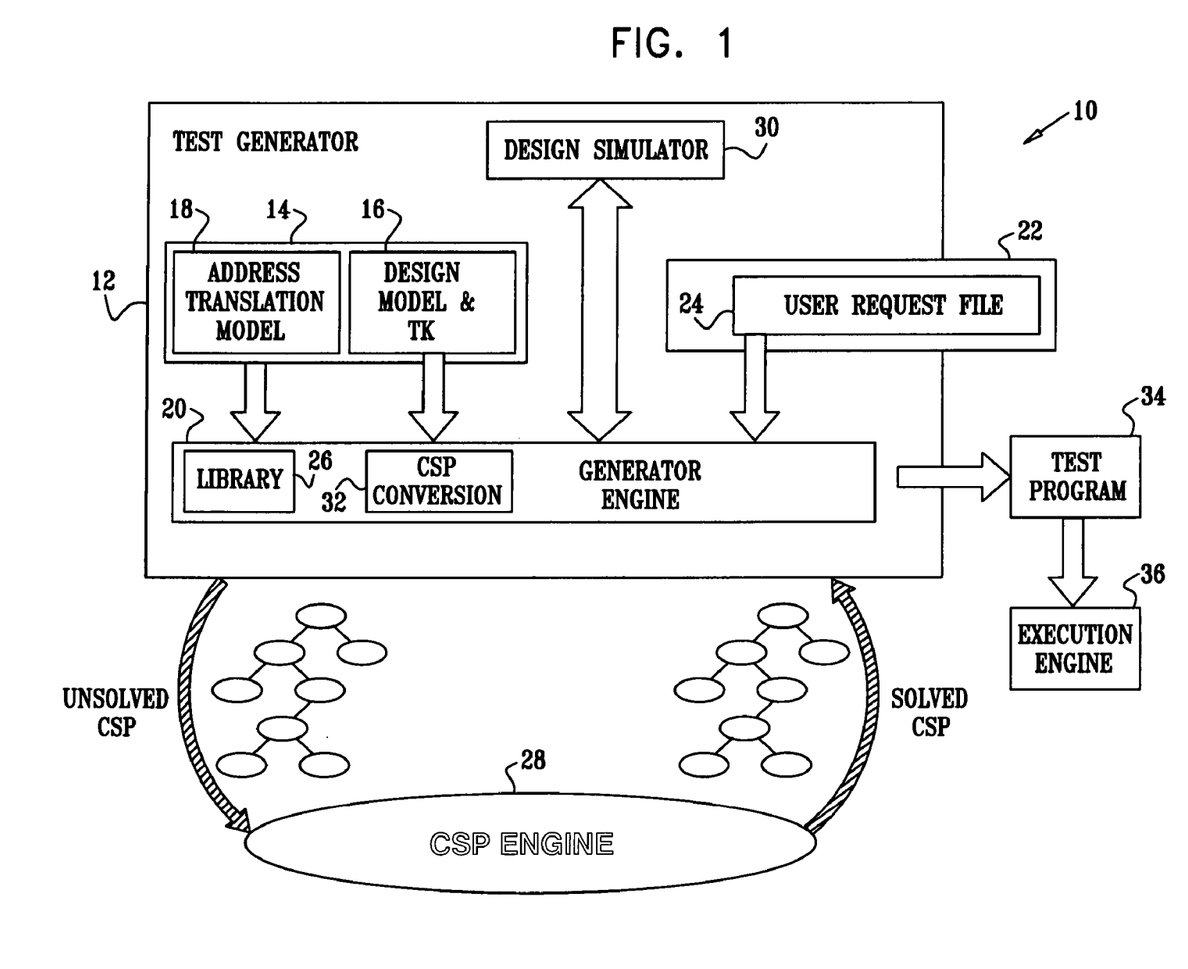
FIG. 1 is a block diagram of a design verification system, which is constructed and operative in accordance with a disclosed embodiment of the invention.

Reference is now made to FIG. 1, which is a high level block diagram of a design verification system 10, which is constructed and operative in accordance with a disclosed embodiment of the invention. The teachings of the present invention are not restricted to systems that are configured like the system 10, but are applicable to many testing systems that have architectures differing from the system 10.

The system 10, which can be used for verifying a software or hardware implementation, has several basic interacting components, which enable the creation of tests that have various degrees of randomness. The system 10 is typically realized as a computer that includes a processor and a memory that contains objects corresponding to the functional blocks depicted in FIG. 1. At the heart of the system 10 is a test generator 12. The ability of the test generator 12 to introduce random unspecified values is generally desirable, since design flaws in practice are usually unpredictable.

An abstract knowledge base 14 holds a formal description of the specification of the design-under-test. This specification may be stored in a database, which may also incorporate testing knowledge of the system design, and may include testing constraints and coverage criteria. The design-under-test could be any hardware module having an address translation mechanism, e.g., a computer processor, bus-bridge, or DMA controller. The knowledge base 14 includes a general model 16 of a design-under-test that includes testing knowledge that is helpful in providing test coverage and biasing the generator toward "interesting" cases. The knowledge base 14 includes a more particularized address translation model 18 that describes the address translation scheme of the design-under-test. In some embodiments the models 16, 18 may be combined into a single model. For any verified design, a test generator developer can construct a declarative model of the translation mechanisms that will be integrated into the address translation model 18.

A test generator engine 20 has a user input 22, which can include a user request file 24. Information submitted by an operator via the user input 22 influences the algorithms used to generate test cases. The test generator engine 20 includes a library 26, which is referenced when the address translation model 18 is submitted to a CSP engine 28, as described in more detail hereinbelow. Many generic test generator engines are suitable for the test generator engine 20, with suitable modifications enabling application of the principles of the invention, which may be accomplished by those skilled in the art. For example, a suitable generator for use as the test generator engine 20 is disclosed in commonly assigned Published U.S. patent application Ser. No. 10/040,940 (Publication No US 2003/0130813 A1), entitled Adaptive Test Program Generation, which is herein incorporated by reference.

Typically, a behavioral simulator or design simulator 30, is included in the system 10. However, the principles of the invention can be applied to test generators that do not employ behavioral simulators.

The address translation model 18 is converted into a constraint satisfaction problem by a CSP conversion module 32 in the test generator, using the library 26. In a first approach, known as "iterative generation", a constraint satisfaction problem is separately generated and solved for each instruction in an instruction stream. Each instruction is simulated or executed directly in hardware or by a design simulator as a stand-alone instruction. The results of the simulation or execution are used to change the current state of the system environment so that the changed environment can be referred to when generating a following instruction, adhering to multi-access rules, and referring to values of memory locations and registers. A composite test case is then constructed based on the results of the individual simulations or executions of the instructions. Finally, the composite test case is executed.

In a second approach, known as comprehensive generation, a single global constraint satisfaction problem is built, applying to all relevant instructions of the instruction stream. The constraint satisfaction problem is then solved by the CSP conversion module 32. A test case is generated from the solution of the global constraint satisfaction problem and executed. The implementation of multi-access architectural rules allows for data linkage between instructions.

In either approach the solution of each constraint satisfaction problem is ultimately converted by the test generator engine 20 into a test case 34. The use of constraint satisfaction problem solution in test generation is described, for example, in commonly-assigned U.S. Patent Application Publication No. 2005/0222827, entitled Accelerated Solution of Constraint Satisfaction Problems by Partitioning of the Variable Space, which is herein incorporated by reference. Constraint satisfaction techniques are further described in the document Using *Constraint Satisfaction Formulations and Solution Techniques for Random Test Program Generation*, E. Bin, R. Emek, G. Shurek, and A. Ziv, IBM Systems Journal, 41 (3) 386–402, August 2002, and the document *Algorithms for Constraint-Satisfaction Problems: A Survey*, V. Kumar, A. I. Magazine, 13(1): 32–44, Spring 1992, both of which are herein incorporated by reference.

Many of the tasks that are addressed by decision-making systems and artificial intelligence can be framed as constraint satisfaction problems (CSPs). In this framework, the task is specified in terms of a set of variables, each of which can assume values in a given domain, and a set of predicates, or constraints, that the variables must simultaneously satisfy. The set of variables and constraints is referred to as a constraint network. Each constraint may be expressed as a relation, defined over some subset of the variables, denoting valid combinations of their values. A solution to the problem (referred to hereinbelow as a "concrete solution") is an assignment of a value to each variable from its domain that satisfies all of the constraints.

For example, Bin et al. describe a constraint satisfaction method for use in automated generation of test programs, in a paper entitled "Using a Constraint Satisfaction Formulation and Solution Techniques for Random Test Program Generation," IBM Systems Journal 41:3 (2002), pages 386–402, which is incorporated herein by reference. The authors show how random test program generation can be modeled as a CSP, and they describe a set of solution techniques that are used in practical test-case generation tools.

A number of constraint satisfaction systems are described in the patent literature. For example, U.S. Pat. No. 5,636,328, whose disclosure is incorporated herein by reference, describes methods and apparatus for finding values that satisfy a set of constraints, applied particularly to control of a robotic arm. U.S. Pat. No. 5,617,510, whose disclosure is also incorporated herein by reference, describes a method, useful in computer-aided design, of identifying possible solutions to an over-constrained system having a collection of entities and constraints.

In the exemplary method disclosed in the above-noted U.S. Patent Application Publication No. 2005/0222827, the solution of the CSP is divided into static and dynamic phases. First, in the static phase, a CSP solver finds one or more "abstract solutions" of the CSP. Each abstract solution comprises a complete assignment of the abstract variables within their respective input domains. The assigned values of the abstract variables are used to compute the (reduced) domains of the concrete variables that are compatible with each abstract solution , and to determine the constraints that are applicable to the concrete variables for each abstract solution. An arc consistency procedure is typically applied to reduce the domains of the concrete variables still further. The reduced domains are used in determining one or more redundant constraints for each abstract solution. In the case of the circuit testing application mentioned above, the redundant constraints embody general knowledge about the circuit design that can be applied in generating multiple test cases, each of which is a specific concrete solution to the CSP.

During the dynamic phase, the CSP solver uses the abstract solutions and the applicable redundant constraints, together with additional constraints that may be imposed on the concrete variables, in order to find concrete solutions to the CSP. Typically, the additional constraints are input by a user of the CSP solver. For example, in order to generate test cases for the above-mentioned electronic circuit, the user may specify particular data values or address ranges to be tested. Each concrete solution found by the CSP solver comprises an assignment of each of the variables in the second set, wherein the assignment is compatible with all the original constraints (including the redundant constraints) and with the additional constraints. The CSP solver uses the redundant constraints to reduce the search space a priori, so that it can find the specific concrete solutions more efficiently. In many cases, for a given abstract solution, the redundant constraints and the additional constraints are incompatible, for example, there is at least one variable in the second set whose reduced domain (based on the abstract solution) fails to intersect with a domain limitation imposed by the additional constraints. In such cases, the CSP solver can immediately discard the abstract solution in question, and thus avoid wasting time on exploration of a barren part of the solution space.

The test case 34 is executed by an execution engine 36 on an implementation of the design-under-test. The execution engine 36 can be a simulator of the design-under-test, or a hardware realization of the design.

Modeling Address Translation.

Continuing to refer to FIG. 1, a declarative modeling language specifically designed for modeling address translation mechanisms is employed in the address translation model 18 to control the operation of the test generator engine 20. The language includes a set of powerful building blocks that can be used to describe a large variety of translation mechanisms. These building blocks include the translated address, various transformations that are carried out as part of the translation process, typically used resources, (e.g., translation tables), and consistency rules. The address translation model 18 may be prepared using any general purpose modeling tool.

The focus of the declarative address translation model 18 is a description of the translation process. This is done in the form of a directed acyclic graph (DAG), in which nodes represent possible intermediate stages, and directed edges represent the possible transformations that occur between the stages. A stage may have several possible outgoing edges, each associated with a different traversal condition. Each node and edge has a list of attributes, to which the transformations and the traversal conditions relate.

A directed acyclic graph according to the invention describes a single address translation. Connectors represent conditions for traversals from one state to another and transformations of the attributes that happen as the result of traversals. Connectors also include transformations that define what actions should be taken. Translation tables are objects that are linked to complex connectors.

Multi-access architectural rules are rules that should be obeyed between different translations. These rules are applicable to situations that cannot be modeled using a single translation and require additional capabilities. Consider this example: The PowerPC® processor requires an election that access to a given memory location be accomplished either using the cache or not. There exists an attribute (WIMG) on the translation path that participates in multi-access architectural rule, which states whether or not the cache is to be involved in the translation. Typically, the WIMG attribute is used to set up a translation lookaside buffer (TLB) incident to the translation. In order to model this rule, an additional mechanism is added that memorizes the value of the WIMG attribute for each memory location. Whenever a memory location is chosen that was previously used during generation of the current test case, the value of the WIMG attribute is kept the same. In this sense, two directed acyclic graphs are linked by a multi-access architectural rule.

Traversals of the DAG, that is movements along particular edges, are determined according to the conditions and transformation specified on the connectors that are described as part of the model. The multi-access architectural rules are implemented as logical tables that maintain translation related information for an entire test program, which includes all the relevant instructions of the instruction stream. The implementation of the logical tables is part of the test generator engine 20, generally included in the library 26. This mechanism implements a common multi-access architectural rule type, which has the form "Same X implies same Y" where X and Y are translation attributes. This is achieved by:

modeling X and Y as DAG node attributes;
remembering all the pairs (X, Y) that were used during the test case generation; and
restricting the pairs of (X, Y) of the currently generated translation path accordingly.

An example of a consistency rule, which is a particular type of multi-access architectural rule, is a prohibition imposed by some architectures of accessing the same memory location via pages of different sizes, i.e., the page size is imposed by the real address.

Figure 2:
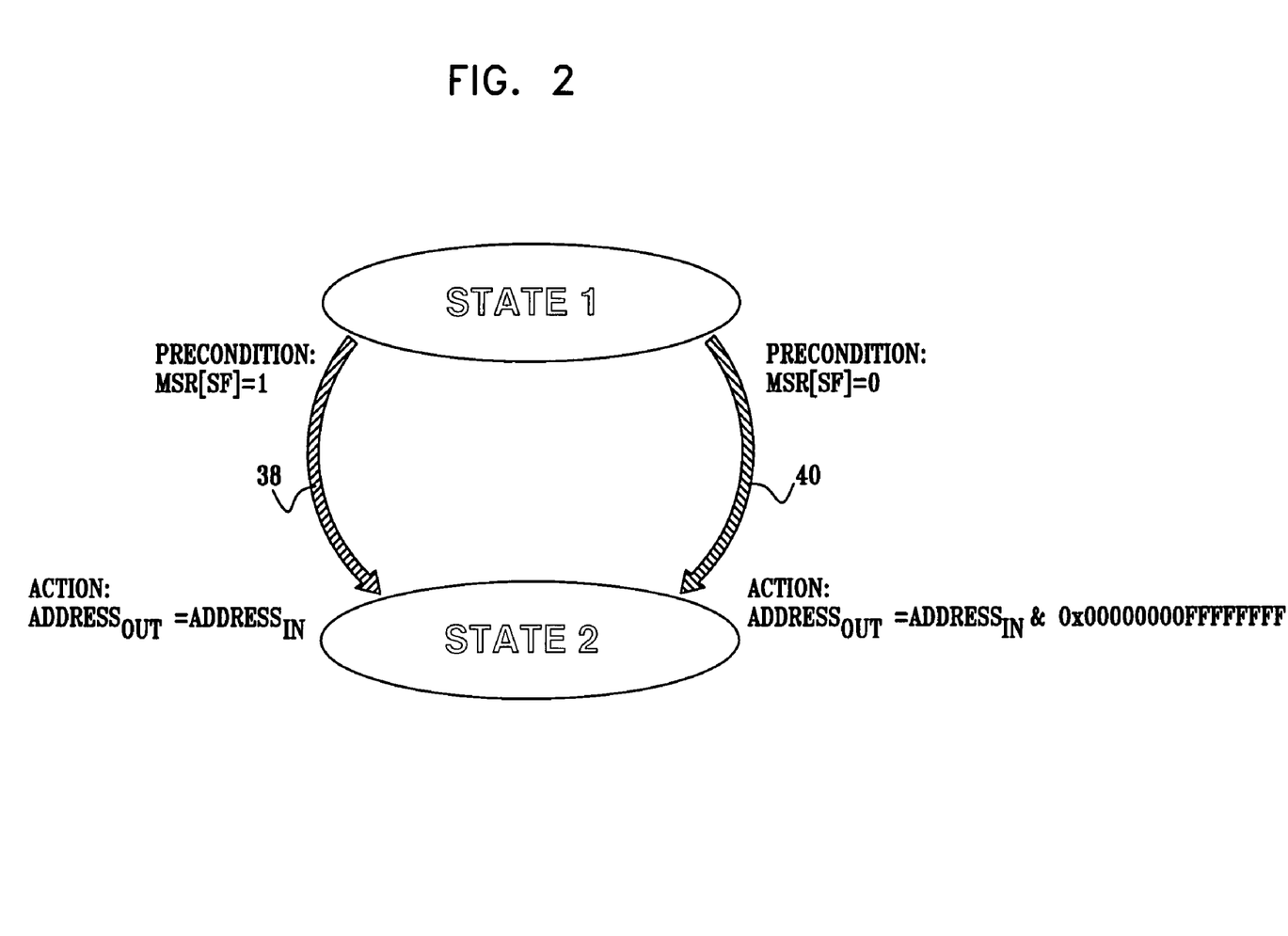
FIG. 2 is a directed acyclic graph that illustrates a model of a portion of an address translation mechanism in accordance with a disclosed embodiment of the invention.

Reference is now made to FIG. 2, which is a simple directed acyclic graph that illustrates a model of a portion of an address translation mechanism in accordance with a disclosed embodiment of the invention. Two edges 38, 40 connect a first state 42 with a second state 44. A transition from the state 42 to the state 44 occurs if either of two preconditions, MSR[SF]=0 OR MSR[SF]=1 is met. One of two possible actions occurs in the state 44, depending on whether the transition occurred along the edge 38 or the edge 40. In the former case, an output address $Address_{out}$ is assigned to be identical to an input address $Address_{in}$. In the latter case, the output address $Address_{out}$ is assigned a value $Address_{in}$ & 0x00000000FFFFFFFF.

Figure 3:
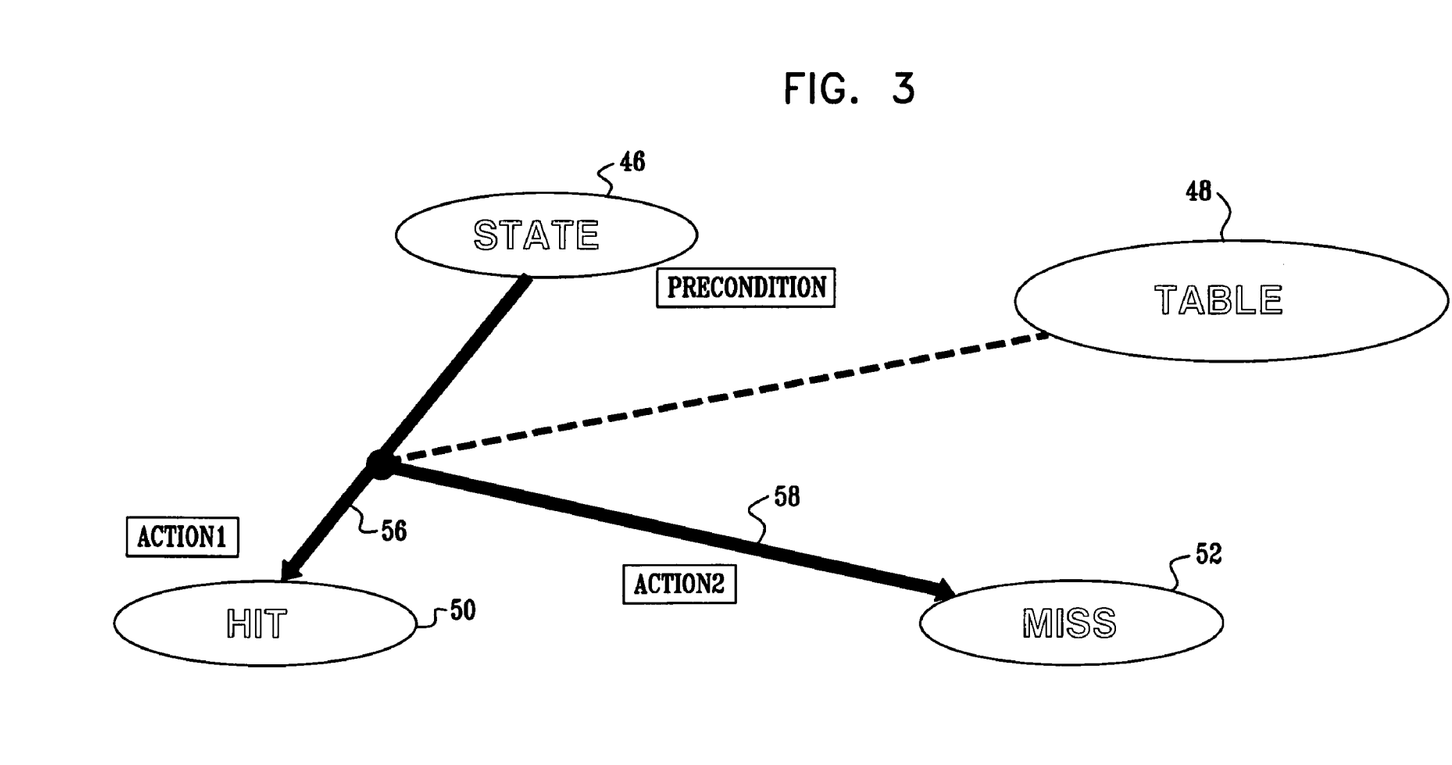
FIG. 3 is a directed acyclic graph illustrating an application of table edges for modeling an address translation mechanism in accordance with a disclosed embodiment of the invention.

Reference is now made to FIG. 3, which is a simplified directed acyclic graph illustrating an application of a translation table in a directed acyclic graph for modeling an address translation mechanism in accordance with a disclosed embodiment of the invention. When a precondition in an initial state 46 is met, a translation table 48, such as a page translation table, is referenced in order to select a state transition from among a plurality of possibilities. Two possibilities are shown in FIG. 3, a hit state 50 and a miss state 52, in which different actions occur. For example, the hit state 50 could represent a state where a translation was found and the miss state 52 could represent a state where a translation was not found. Such edges in the directed acyclic graph are referred to as table edges. Table edge 54 connects the state 46 with the translation table 48. Table edges 56, 58 connect the translation table 48 with the hit state 50 and the miss state 52, respectively. Thus, the table edges 54, 56, 58 connect three states.

Figure 4:
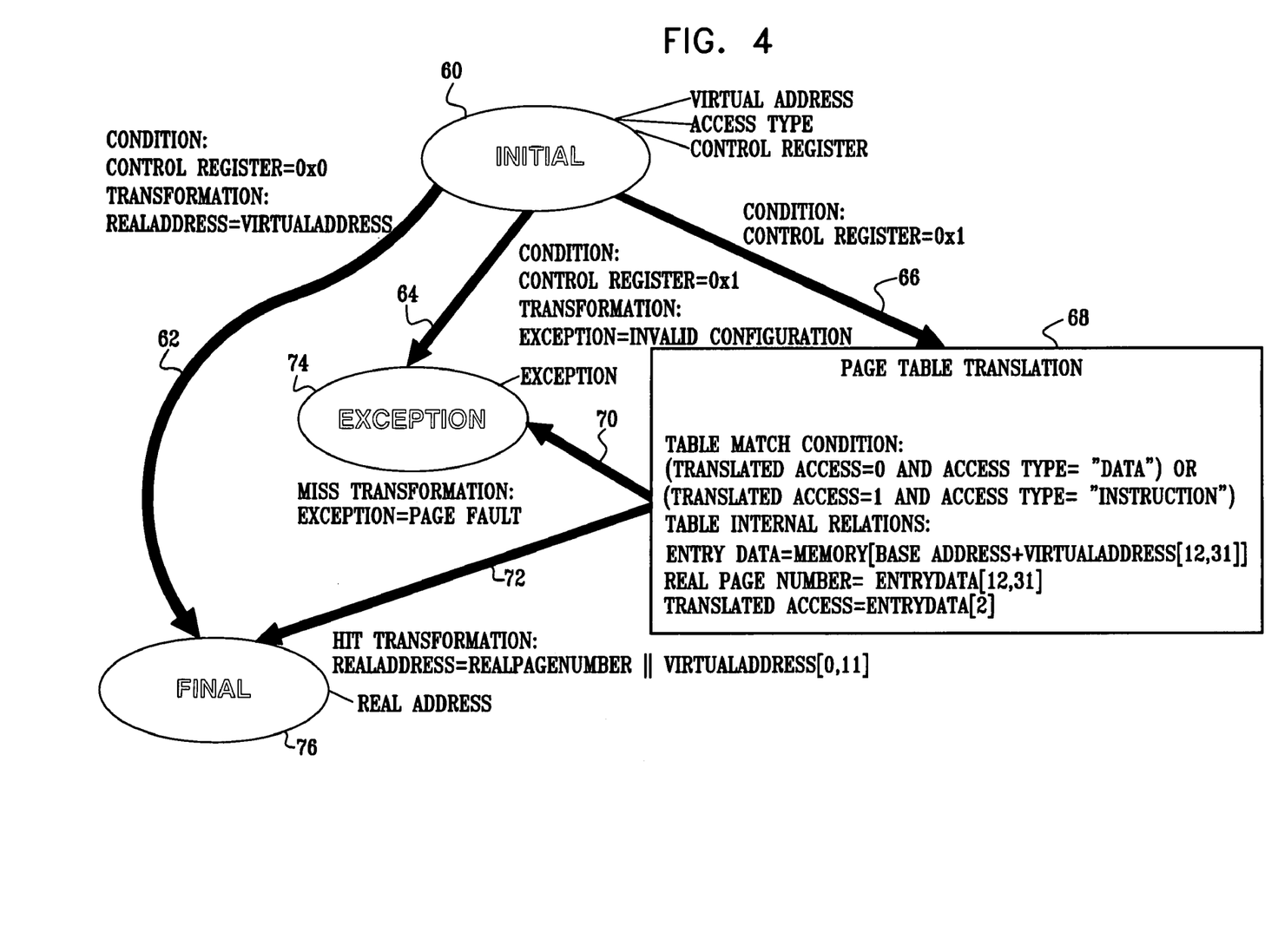
FIG. 4 is a directed acyclic graph representing an address translation path in accordance with a disclosed embodiment of the invention.

Reference is now made to FIG. 4, which is an exemplary directed acyclic graph representing an address translation path in accordance with a disclosed embodiment of the invention. An initial stage 60 has several attributes. A virtual address attribute provides a virtual address that is to be translated into a physical address. An access attribute indicates the type of access (e.g., data or fetch), and a control register attribute provides the value of a register that controls the translation process. From the initial stage 60, address translation may proceed through one of three possible edges 62, 64, and table edge 66, depending on the value of a control register attribute. In general, a transformation associated with an edge links together the attributes of preceding and succeeding stages.

Translation tables are widely used in various translation mechanisms. The modeling language according to the invention provides constructs for modeling translation tables. A model of a translation table includes a set of specific properties, such as its size and entry fields. It also provides a match condition, which defines whether a table entry translates a given address. In addition, it specifies the transformations between the attributes of the directed acyclic graph stages connected by the translation table and various additional constraints between table attributes. The modeling example shown in FIG. 4 includes a translation table 68, which models page translation. In the translation table 68, there are two different transformations specified, represented by table edges 70, 72, respectively, leading to an exception stage 74 and a final stage 76. The path followed from the translation table 68 depends on whether or not a matching entry was found in the table, i.e., whether the match condition was or was not satisfied. It will be noted that internal conditions that are included in the translation table 68 specify the effects of following the table edges 70, 72. The table edges 66, 70, 72 constitute a complex connector that is linked to the translation table 68.

Thus, at initial stage 60, if the value of the control register is 0x0, the real address is identical to the virtual address, and no address translation is necessary. A state transition occurs directly to the final stage 76 via the edge 62. This type of state transition is known as a "simple transition", as a translation table is not involved.

If, however the value of the control register is 0x1, an address translation is necessary. The translation table 68 is consulted, and the resulting address translation is known as a "table translation". If one of the match conditions in the translation table 68 is met, then an appropriate one of the address translation rules of the translation table 68 is applied, and the system then undergoes a state transition to the final stage 76 via the edge 72. The appropriate address translation rule is applied to yield the desired address translation. But if none of the match conditions in the translation table 68 is met, the system undergoes a state transition to the exception stage 74 via the edge 70.

Figure 5:
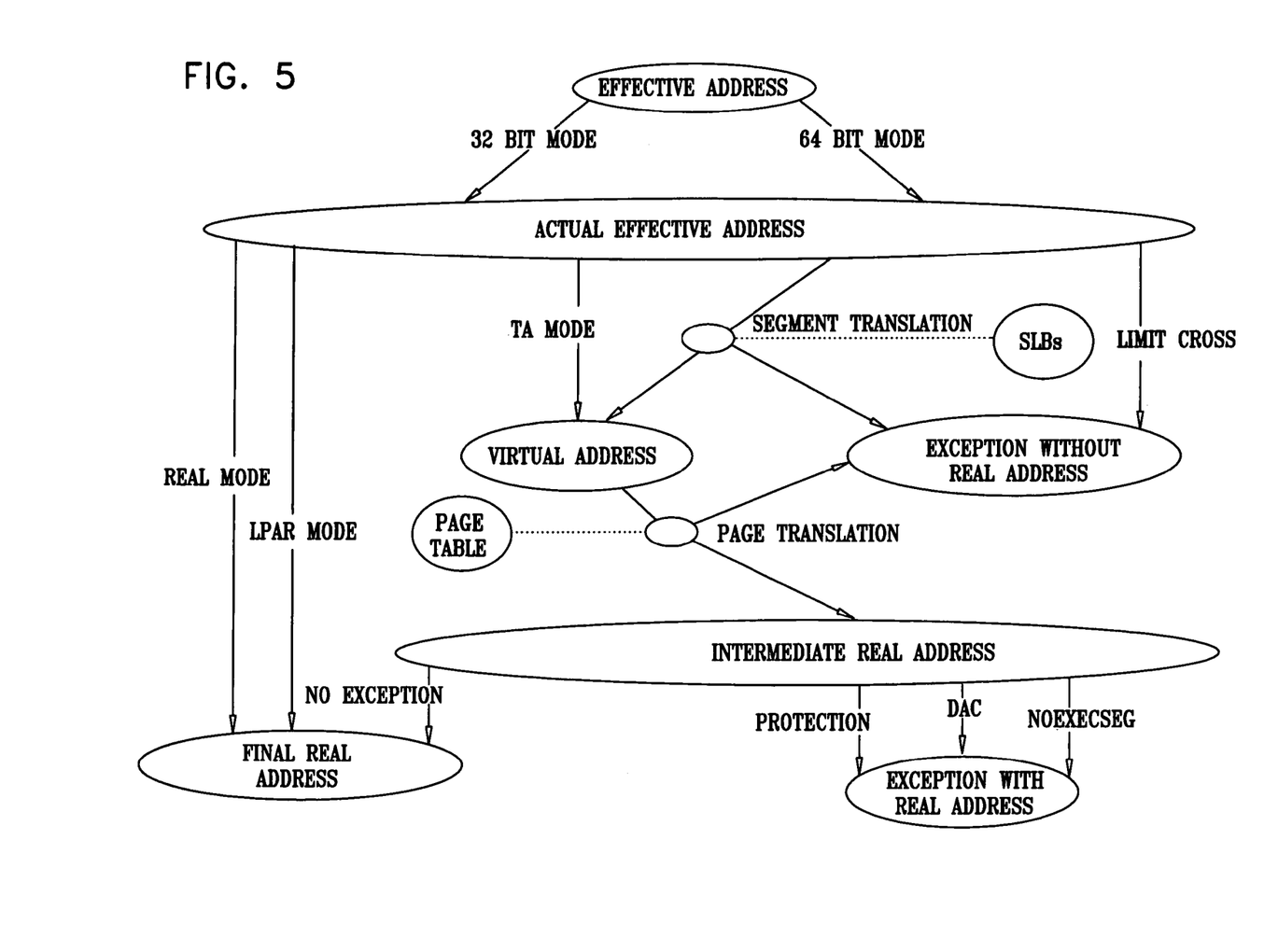
FIG. 5 is a more detailed directed acyclic graph representing an address translation mechanism of a computer processor in accordance with a disclosed embodiment of the invention.

Reference is now made to FIG. 5, which is a more detailed directed acyclic graph representing an address translation mechanism of the PowerPC processor in accordance with a disclosed embodiment of the invention. FIG. 5 is presented in order to indicate how a more complex structure can be modeled by applying the principles disclosed hereinabove with respect to FIG. 4.

Iterative Generation.

Figure 6:
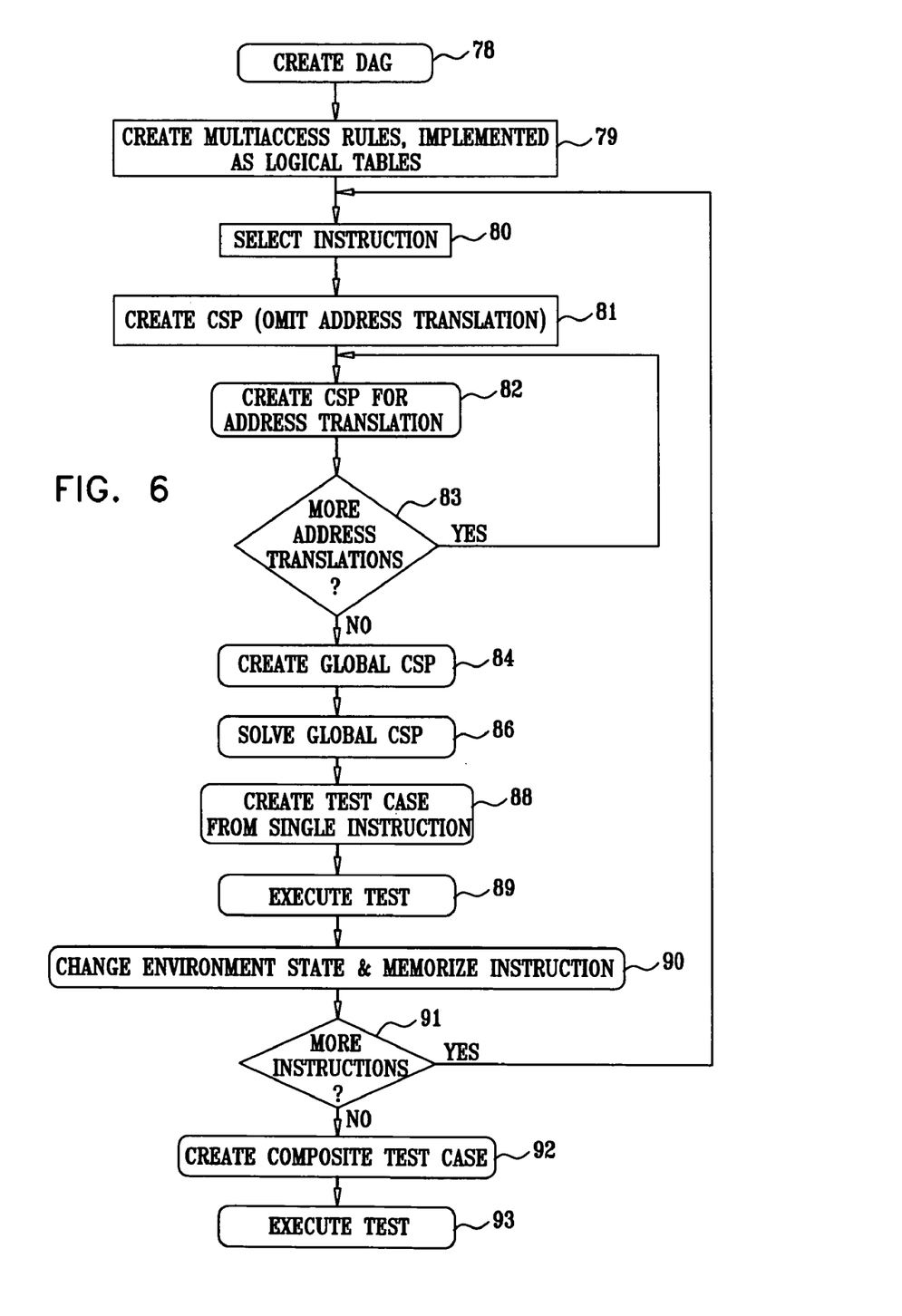
FIG. 6 is a flow chart illustrating a method for creating and using a declarative model of an address translation mechanism of a design-under-test employing iterative generation in accordance with a disclosed embodiment of the invention.

Reference is now made to FIG. 6, which is a flow chart illustrating a method for creating and using a declarative model of an address translation mechanism of a design-under-test in accordance with a disclosed embodiment of the invention. In FIG. 6 it is assumed that iterative generation is employed. The case of comprehensive generation is disclosed below. At initial step 78 the address translation mechanism of the design-under-test is analyzed, and a directed acyclic graph prepared in the manner described above. Initial step 78 includes specification of nodes (stages) of the directed acyclic graph, and connectors or edges, including the conditions for traversal from one state to another and transformations of attributes that occur as a result of traversals. Testing knowledge, for example non-mandatory constraints, is automatically incorporated into the directed acyclic graph. Additionally or alternatively, testing knowledge may be manually incorporated into the directed acyclic graph. The testing knowledge facilitates the generation of interesting test cases. Translation tables are completed and linked to complex connectors. The translation tables may also be linked to any attributes specified in the directed acyclic graph, e.g., addresses, table fields, and access permissions. Satisfaction of a match condition in a translation table would lead to a state transition.

Next, at step 79, multi-access architectural rules relating to the design-under-test are established as logical tables for the directed acyclic graph. These rules are obeyed between different translations. For example, if it is forbidden to access a particular address using two different methods—with and without the use of a memory cache, a logical table can maintain a record of the method by which addresses have been accessed, for consideration when solving a subsequent constraint satisfaction problem. The logical table may keep a record of instances of an instruction, in order to assure consistency of cache use by subsequent instances of the instruction when a particular address is accessed.

Next, at step 80, an instruction in the instruction stream is selected as a current instruction.

Next, at step 81, a constraint satisfaction problem is formulated for all aspects of the current instruction, other than address translation aspects.

Next, at step 82, using the address translation model that was prepared in initial step 78 and step 79, the completed DAG is transformed into a constraint satisfaction problem using known methods, as disclosed in the above-noted patent applications and publications. Briefly, in order to convert the directed acyclic graph into a constraint satisfaction problem, a CSP variable is created for each property modeled on the nodes and edges of the directed acyclic graph. In addition a Boolean CSP variable (isUsed) is created for each node and edge in the directed acyclic graph, indicating whether or not that node or edge was used in the specific translation. The condition and transformation constraints on the edges are converted into constraints related to these Boolean variables, and to other variables describing translation properties corresponding to condition and transformation constraints. Constraints specified for nodes and connectors are added to the constraint satisfaction problem as well.

Next, at decision step 83, a determination is made whether there are more address translation mechanisms in the current instruction that need to be modeled as a constraint satisfaction problem. It will be recalled from the discussion above and a consideration of FIG. 5 that individual instructions can require multiple address translations.

If the determination at decision step 83 is affirmative, then control returns to step 82.

If the determination at decision step 83 is negative, then control proceeds to step 84. Here all the constraint satisfaction problems that were formulated in step 81 and step 82 are combined into a global constraint satisfaction problem.

Next, at step 86, the global constraint satisfaction problem is solved, using a CSP engine.

Next, at step 88 a part of a test case is generated from the solution to the global constraint satisfaction problem that was found in step 86. It will be noted that this part of the test case applies to a single instruction.

Next, at step 89, the part of the test case corresponding to the single instruction that was generated in step 88 is executed on the design-under-test. Alternatively, for convenience, several parts of the test case, including several instructions may be accumulated and then executed in turn in a separate proceeding.

Next, at step 90, the state of the environment is changed responsively to the execution of the test case in step 89. The current instruction is memorized, in order to construct a composite test case, which is disclosed below.

Next at decision step 91 a determination is made whether more instructions in the instruction stream remain to be processed. If the determination at decision step 91 is affirmative, then control returns to step 80.

If the determination at decision step 91 is negative, then at step 92 a composite test case is created, using the details of the instructions that were memorized in step 90. This involves the construction and solution of a combined constraint satisfaction problem, which is disclosed below in the discussion of comprehensive generation techniques.

Next, at final step 93, the composite test case created in step 92 is executed, and the procedure terminates.

Comprehensive Generation.

Figure 7:
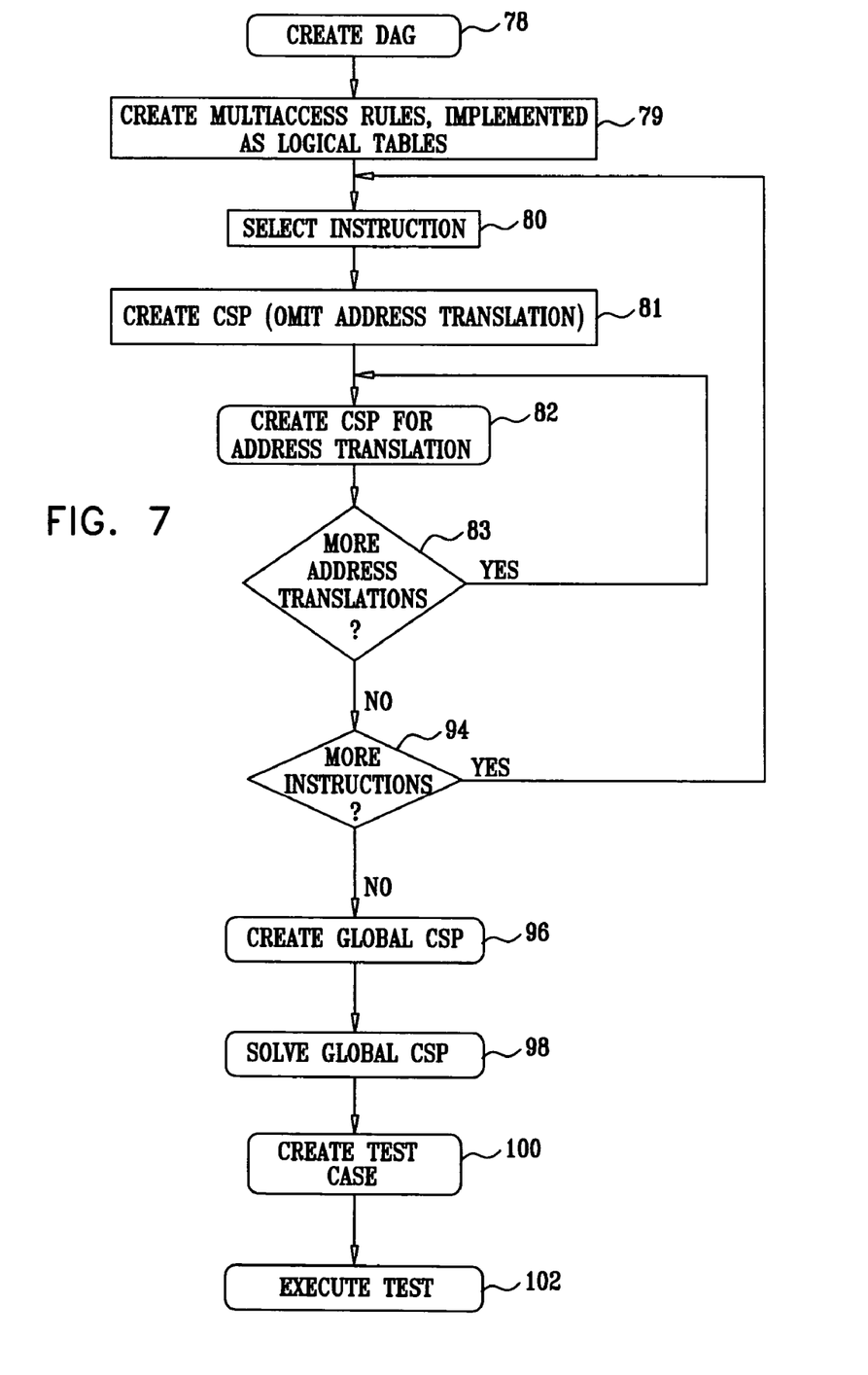
FIG. 7 is a flow chart illustrating a method for creating and using a declarative model of an address translation mechanism of a design-under-test employing comprehensive generation in accordance with a disclosed embodiment of the invention.

Reference is now made to FIG. 7, which is a flow chart illustrating a method for creating and using a declarative model of an address translation mechanism of a design-under-test using comprehensive generation in accordance with a disclosed embodiment of the invention. Initial step 78, steps 79, 80, 81, 82, and decision step 83 are performed in the same manner as described with respect to FIG. 6. The details are not repeated in the interest of brevity. However, it should be noted that different instructions in the instruction stream may have different constraints, which need to be considered in building and solving the constraint satisfaction problem in step 82.

If the result of decision step 83 indicates that constraint satisfaction problems have been prepared for all address translations in the current instruction, then control proceeds to decision step 94, where it is determined if more instructions in the instruction stream need to be processed.

If the determination at decision step 94 is affirmative, then control returns to step 80.

If the determination at decision step 94 is negative, then control proceeds to step 96. It may be noted that the order of preparing the constraint satisfaction problems (steps 81, 82) for the instructions in the instruction stream is not critical. For example, in some embodiments step 81 could be performed on all instructions in the stream, followed by the iterative performance of step 82 on all the instructions in the instruction stream. Indeed, many combinations are possible. In any case, step 96 is performed when all constraint satisfaction problems have been formulated for the instruction stream, or relevant portion thereof. A global constraint satisfaction problem is prepared by combining the all constraint satisfaction problems that were produced in step 81 and step 82. As noted above in the discussion of FIG. 6, logical tables are used to pass information between different constraint satisfaction problems in different instructions.

Next, at step 98, the global constraint satisfaction problem prepared in step 96 is solved, using a CSP engine.

Next, at step 100 a test case is generated from the solution to the global constraint satisfaction problem in step 98. It will be noted that the test case applies to multiple instructions.

Next, at final step 102, the test case generated in step 100 is executed on the design-under-test, and the procedure terminates.

Testing Knowledge.

Referring again to FIG. 1, a test generator targeted at the verification of the address translation mechanism should be able to generate events that cover areas of interest that are likely to unveil design flaws. A pseudorandom test generator should thus employ some kind of testing knowledge (TK) designed to increase the coverage of desired verification events that are not likely to be generated randomly. Address translation testing knowledge may include the following:

(1) Scenarios that trigger various translation mechanisms. For example, various types of translation related exceptions can be triggered when a translation entry is not found in the table, or when access protection rules are violated.

(2) Scenarios that involve several translations, for example, aliasing scenarios that translate different virtual addresses to the same physical address.

(3) Scenarios that trigger events related to translation tables, for example, successive accesses to adjacent locations in a translation table.

Much testing knowledge is generic in the sense that it is appropriate for translation mechanisms of many designs. The test generator 12 can generate much of the generic testing knowledge from the declarative model of the translation mechanism, as described hereinbelow.

Such testing knowledge is stored in a memory associated with the model 16, and is automatically made available for any modeled design without coding effort by the developer of a particular address translation model for the test generator 12. At most, a developer would need to select some testing knowledge so that it is made available to the test generator 12. Typically, the end user activates or customizes the use of such generic testing knowledge by the test generator 12 through directives, which are input via the user input 22. The user input 22 in the current embodiment is realized as a graphical class properties editor.

The system 10 implements several mechanisms that enable it to automatically construct generic testing knowledge from the model. These include the following:

Value Partitioning.

In a mechanism referred to as "value partitioning", the domain of each modeled attribute value may be partitioned into several sub-domains. For example, the value of an effective address may be partitioned into small addresses ([0x00000000, 0x0000FFFF), regular addresses ([0x00010000, 0x0FFFFFFF]), and large addresses ([0x100000000, 0xFFFFFFFF]). Value partitioning can be described as a part of the address translation model 18.

For enumerated value domains, e.g., the domain of types of exceptions, every possible attribute value is considered to be a separate partition, unless modeled otherwise.

For a partitioned attribute, automatically produced testing knowledge enables the generation of values from each partition with a probability specified by the end user. Indeed, using this mechanism it is possible to generate test cases for all possible translation-related exceptions.

Used Attribute Value.

The test generator 12 memorizes the values of modeled attributes that were generated for earlier tests of the translation mechanism. For selected attributes, testing knowledge can be automatically created so as to bias a choice of attribute values that are identical to or related to historic values of these attributes. This mechanism, referred to as the "used attribute value mechanism", can generate testing knowledge for various aliasing events, such as translation to the same physical or intermediate address in different translation instances. The used attribute value mechanism also generates testing knowledge for the generation of contiguous accesses to adjacent locations in a page table. This is accomplished by storing values, which have been utilized for an attribute of a model. Subsequently, a contiguous (or closely related) value for the attribute is selected, e.g., a previous value +10.

Translation Path Control.

Using a mechanism referred to as "translation path control", the test generator 12 analyzes the DAG model of the address translation process to determine all the possible paths that an address translation can take. Based on this analysis, testing knowledge is automatically generated to enable the end user to control the paths actually taken in a test case. The paths can be biased, for example, by assigning relative weights to certain paths.

For example, in FIG. 4 it can be appreciated that four translation paths exist. For each path, a CSP variable tp can be generated having a different value. Constraints can be established that link the variable tp and the corresponding translation paths. The constraints can be adjusted so as to bias the path to be followed. In FIG. 4, the variable tp could have 4 possible values, and it would be linked to other variables by constraints, to control the effective path, as shown in Table 1.

TABLE 1

| Value of tp | Path |
|---|---|
| 1 | edge 62 |
| 2 | edge 64 |
| 3 | table edges 66, 70 |
| 4 | table edges 66, 72 |

Value partitioning may be applied to the variable tp.

Translation Table Close Match.

Using a mechanism referred to as "translation table close match", the test generator 12 automatically creates testing knowledge for generating translation table-related events in the test case. For example, in a "close match" event, the translation table contains entries that are not actually supposed to be used for the translation, but are similar to the entry to be used. However, generation of close match entries is useful because design defects could be unmasked if close match entries were mistaken for correct entries.

Figure 8:
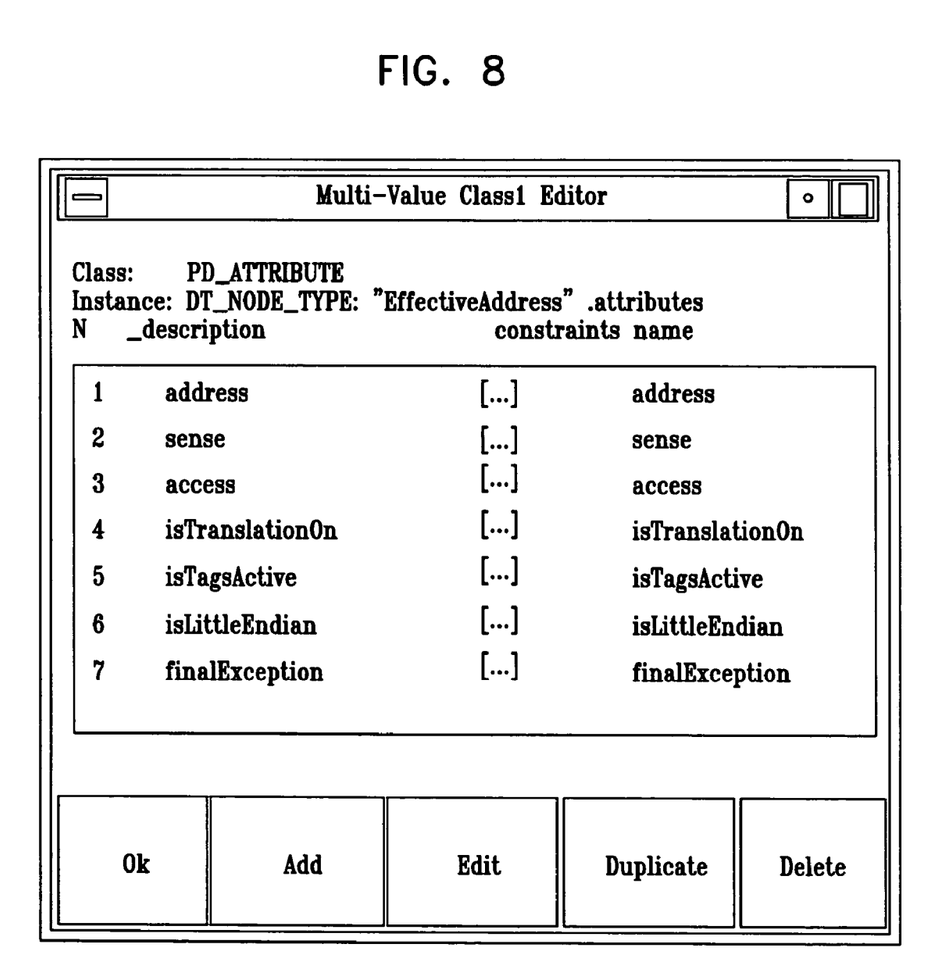
FIG. 8 is a representative screen display of a class properties editor, which is employed in the user input of the system shown in FIG. 1 in accordance with a disclosed embodiment of the invention.

Reference is now made to FIG. 8, which is a representative screen display of a class properties editor, which is employed in the user input 22 (FIG. 1). Such an editor is typically provided by each test generator. FIG. 8 is directed to a table containing effective attributes that would be associated with a state of a DAG, and is an example of a modeling language statement that is used to model the translation mechanism. Using the class properties editor, test generation can be directed by an end user by selecting testing knowledge that has been previously generated from a model of the translation mechanism of a design-under-test. For example, the user might be permitted to enable or disable close matching events in a table.

It is thus an advantage of the invention that testing knowledge can be propagated to models of many different designs-under-test to produce extensive coverage of translation mechanisms. This advantage cannot be realized by conventional ad hoc solutions. The developer is able to add non-generic testing knowledge to a model that may be required by a specific design verification plan. However, a significant portion of the testing knowledge, including the examples given above, is provided with the system 10 (FIG. 1).

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for testing an address translation mechanism of a design-under-test comprising the steps of:

modeling said address translation mechanism as a directed acyclic graph having nodes and edges that connect said nodes, wherein said nodes represent stages of said mechanism, and said edges represent state transitions between said stages, wherein in said address translation mechanism a virtual address is translated into a physical address, wherein modeling said address translation mechanism comprises establishing tables that are linked to said nodes by table edges, and entering match conditions in entries of said tables, wherein satisfaction of one of said match conditions causes one of said state transitions to occur via a designated one of said table edges, and generating testing knowledge relevant to test programs for a second design-under-test by entering in at least a portion of said tables close match events comprising additional conditions that differ from said match conditions wherein satisfaction of said additional conditions do not satisfy said match conditions;

formulating a constraint satisfaction problem from said directed acyclic graph by creating a Boolean variable for each of said nodes and said edges, wherein said Boolean variable indicates if a respective one of said nodes or said edges is used in one of said state transitions;

solving said constraint satisfaction problem so as to generate a test case for said design-under-test; and executing said test case in said design-under-test.

2. The method according to claim 1, further comprising the step of associating multi-access architectural rules of said design-under-test with said directed acyclic graph for traversal thereof, wherein said multi-access architectural rules specify a plurality of access methods to a memory location.

3. The method according to claim 1, further comprising the step of establishing translation tables that are linked to said edges.

4. The method according to claim 1, further comprising the step of establishing multi-access architectural rules for traversal of said directed acyclic graph, wherein said multi-access architectural rules specify a plurality of access methods to a memory location.

5. The method according to claim 4, wherein said multi-access architectural rules are implemented as logical tables.

6. The method according to claim 1, wherein said step of generating testing knowledge is performed by value partitioning.

7. The method according to claim 1, wherein said step of generating testing knowledge is performed by memorizing values of modeled attributes that were produced in a previous constraint satisfaction problem.

8. The method according to claim 1, wherein said step of generating testing knowledge is performed by biasing at least a portion of said nodes and said edges of said directed acyclic graph.

9. The method according to claim 1, further comprising the step of entering transformations in said tables that correspond to different ones of said match conditions.

10. A computer software product, including a computer-readable medium in which computer program instructions are stored, which instructions, when read by a computer, cause the computer to perform a method for testing an address translation mechanism of a design-under-test comprising the steps of:
    modeling said address translation mechanism as a directed acyclic graph having nodes and edges that connect said nodes, wherein said nodes represent stages of said mechanism, and said edges represent state transitions between said stages, wherein in said address translation mechanism a virtual address is translated into a physical address, wherein modeling said address translation mechanism comprises establishing tables that are linked to said nodes by table edges, and entering match conditions in said tables, wherein satisfaction of one of said match conditions causes one of said state transitions to occur via a designated one of said table edges, and generating testing knowledge relevant to test programs for a second design-under-test by entering in at least a portion of said tables close match events comprising additional conditions that differ from said match conditions wherein satisfaction of said additional conditions do not satisfy said match conditions;
    formulating a constraint satisfaction problem from said directed acyclic graph by creating a Boolean variable for each of said nodes and said edges, wherein said Boolean variable indicates if a respective one of said nodes or said edges is used in one of said state transitions;
    solving said constraint satisfaction problem so as to generate a test case for said design-under-test; and
    executing said test case in said design-under-test.

11. The computer software product according to claim 10, wherein said computer is further instructed to perform the step of establishing multi-access architectural rules for traversal of said directed acyclic graph, wherein said multi-access architectural rules specify a plurality of access methods to a memory location.

12. The computer software product according to claim 10, wherein said computer is further instructed to perform the step of establishing translation tables that are linked to said edges.

13. The computer software product according to claim 10, wherein said computer is further instructed to perform the step of establishing multi-access architectural rules for traversal of said directed acyclic graph, wherein said multi-access architectural rules specify a plurality of access methods to a memory location.

14. The computer software product according to claim 13, wherein said multi-access architectural rules are implemented as logical tables.

15. The computer software product according to claim 10, wherein said step of generating testing knowledge is performed by value partitioning.

16. The computer software product according to claim 10, wherein said step of generating testing knowledge is performed by memorizing values of modeled attributes that were produced in a previous constraint satisfaction problem.

17. The computer software product according to claim 10, wherein said step of generating testing knowledge is performed by biasing at least a portion of said nodes and said edges of said directed acyclic graph.

18. The computer software product according to claim 10, wherein said computer is further instructed to perform the step of entering transformations in said tables that correspond to different ones of said match conditions.

19. A verification system for an address translation mechanism of a design-under-test comprising:
    a processor operative to access a declarative model of said address translation mechanism, wherein a virtual address is translated into a physical address, said address translation mechanism being represented as a directed acyclic graph having nodes and edges that connect said nodes, wherein said nodes represent stages of said mechanism, and said edges represent state transitions between said stages corresponding to respective ones of said nodes being connected by said edges, wherein said processor is operative to apply multi-access architectural rules for traversal of said directed acyclic graph with said nodes, and said multi-access architectural rules specify a plurality of access methods to a memory location, wherein said model of said address translation mechanism by comprises tables that are linked to said nodes by table edges, match conditions being entered in said tables, wherein satisfaction of one of said match conditions causes one of said state transitions to occur via a designated one of said table edges, and a memory holding testing knowledge relevant to test programs for a second design-under-test, said testing knowledge being automatically generated by said verification system using said declarative model by including in at least a portion of said tables close match events comprising additional conditions that differ from said match conditions wherein satisfaction of said additional conditions do not satisfy said match conditions;
    said processor being operative to formulate a constraint satisfaction problem from said directed acyclic graph by creating a Boolean variable for each of said nodes and said edges, wherein said Boolean variable indicates if a respective one of said nodes or said edges is used in one of said state transitions; and
    said processor being operative for solving said constraint satisfaction problem to generate a test case for said design-under-test and to output said test case for execution in said design-under-test.

20. The verification system according to claim 19, wherein said processor is operative to establish said multi-access architectural rules so as to govern different translations.

21. The verification system according to claim 20, wherein said multi-access architectural rules are implemented as logical tables.

22. The verification system according to claim 19, wherein said testing knowledge is generated by value partitioning.

23. The verification system according to claim 19, wherein said testing knowledge is generated by memorizing values of modeled attributes that were produced in a previous constraint satisfaction problem.

24. The verification system according to claim 19, wherein said testing knowledge is generated by biasing at least a portion of said nodes and said edges of said directed acyclic graph.

25. The verification system according to claim 19, wherein said tables include transformation entries that correspond to different ones of said match conditions.

* * * * *